Jan. 27, 1942. H. V. KAPP 2,271,263
APPARATUS FOR CLASSIFYING OR SEPARATING FLUID-BORNE MATERIALS
Filed Oct. 14, 1939 5 Sheets-Sheet 1
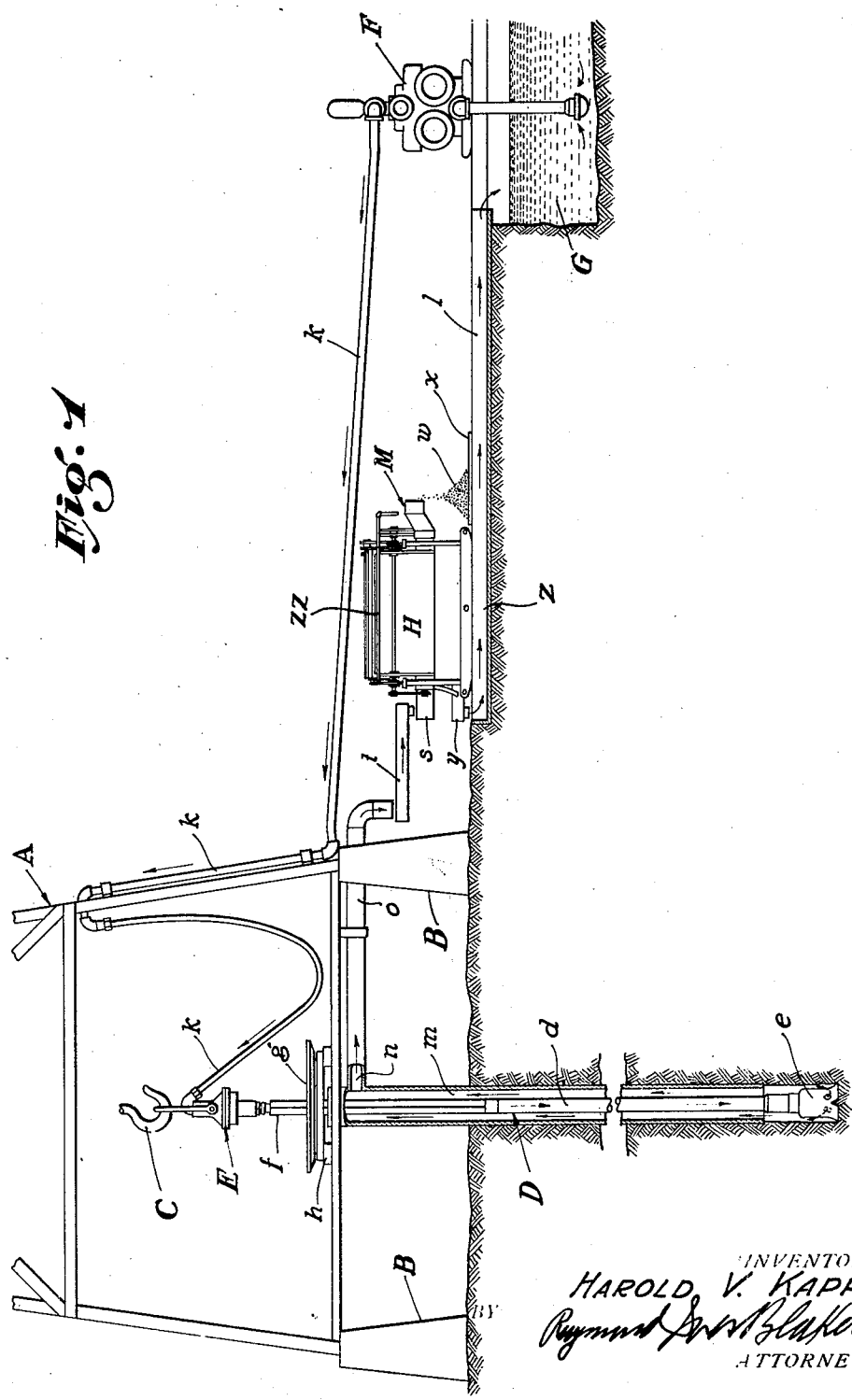
INVENTOR,
HAROLD V. KAPP;
ATTORNEY.

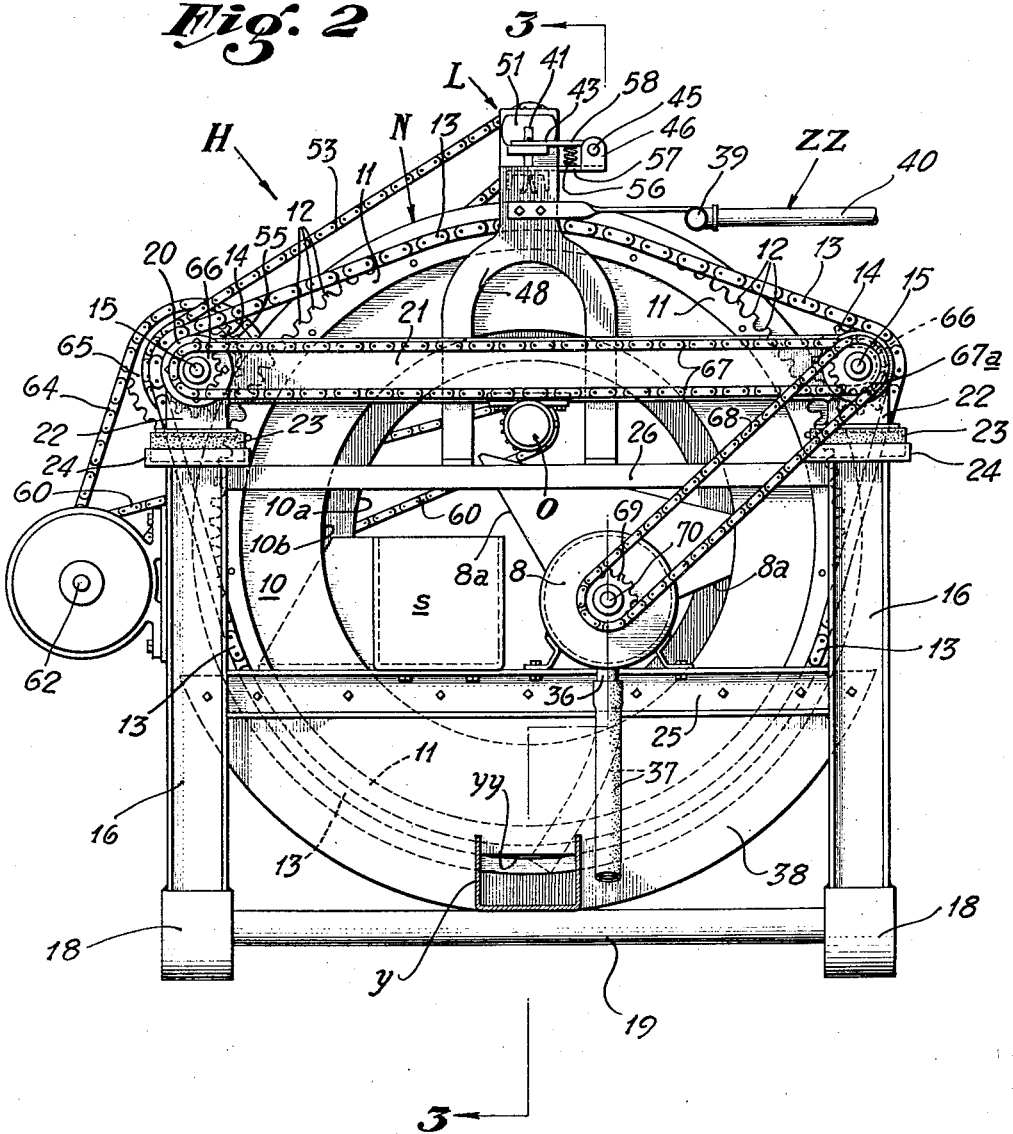

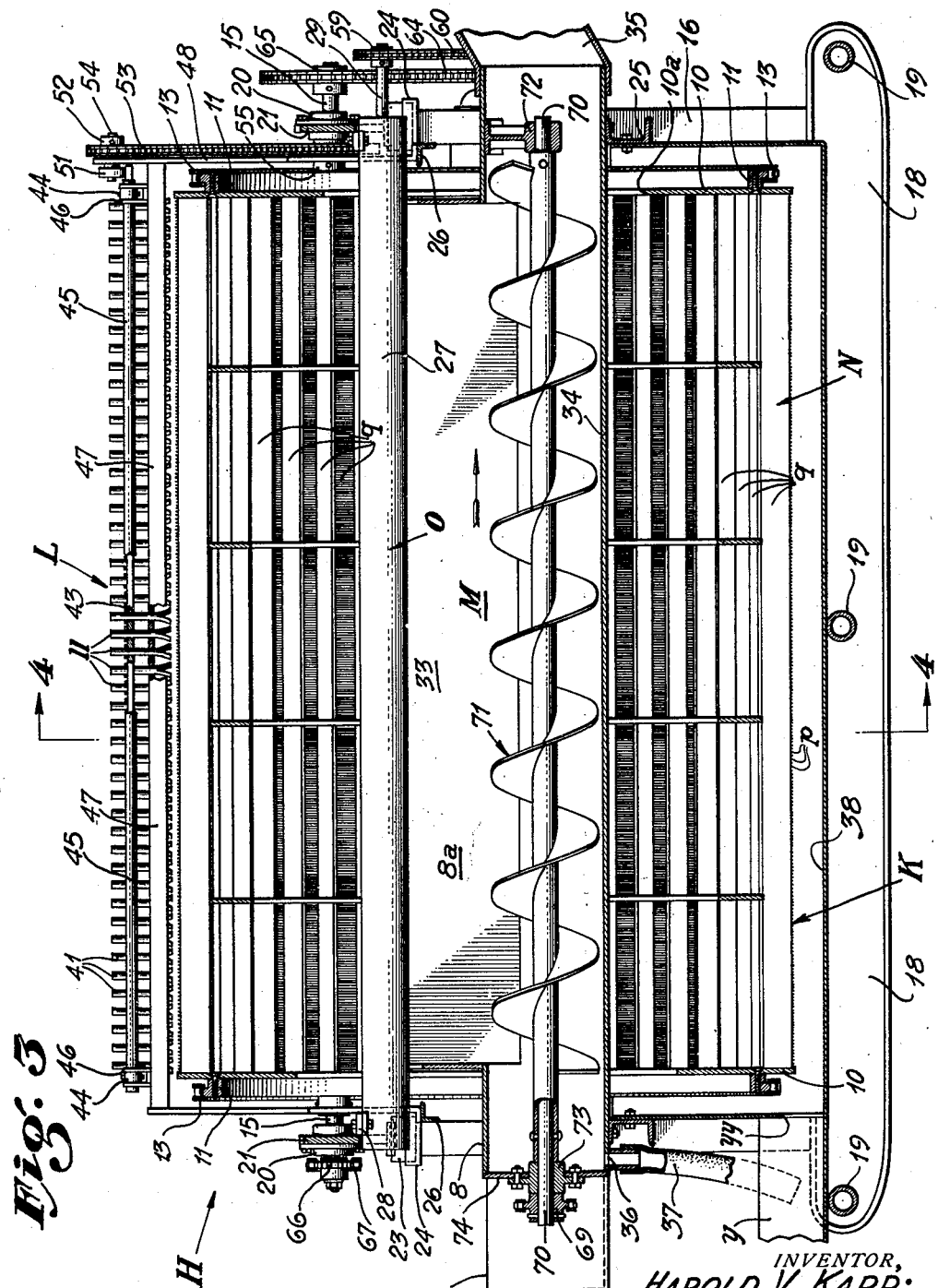

Jan. 27, 1942. H. V. KAPP 2,271,263
APPARATUS FOR CLASSIFYING OR SEPARATING FLUID-BORNE MATERIALS
Filed Oct. 14, 1939 5 Sheets-Sheet 4
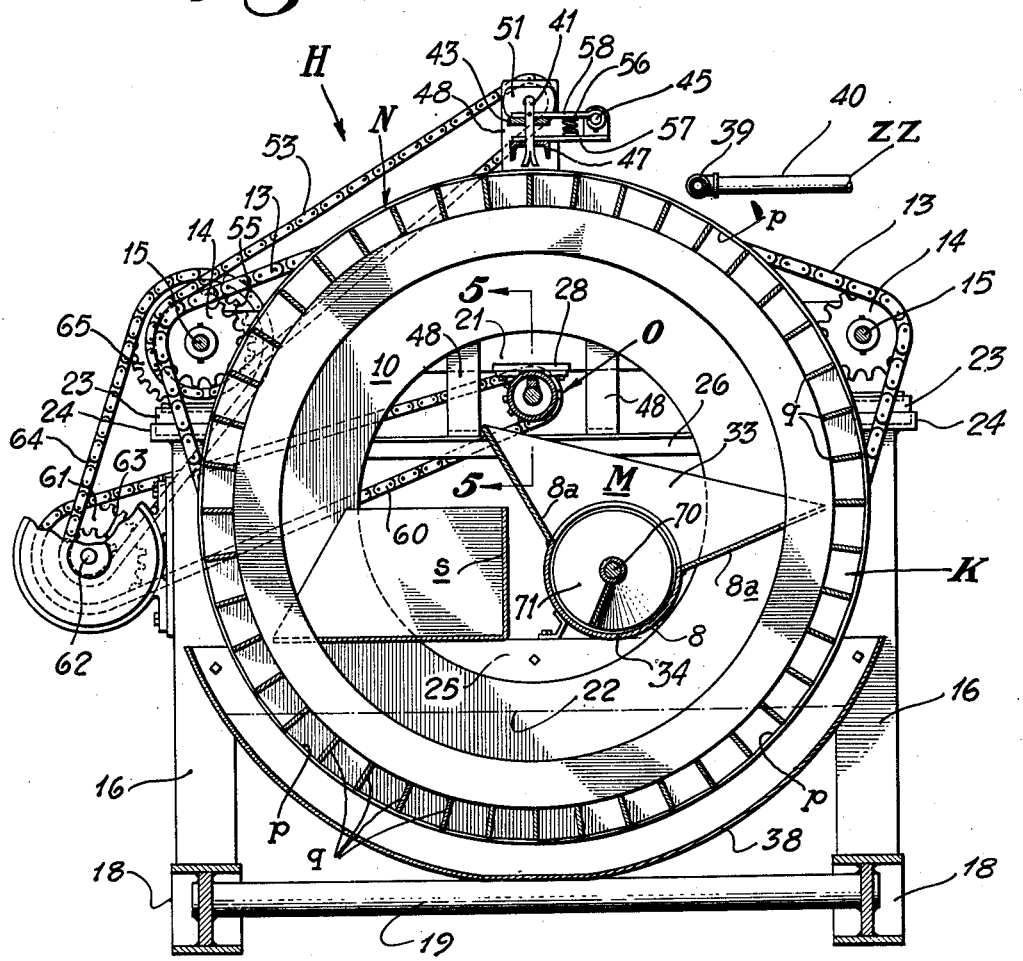
INVENTOR,
HAROLD V. KAPP;
BY
ATTORNEY.

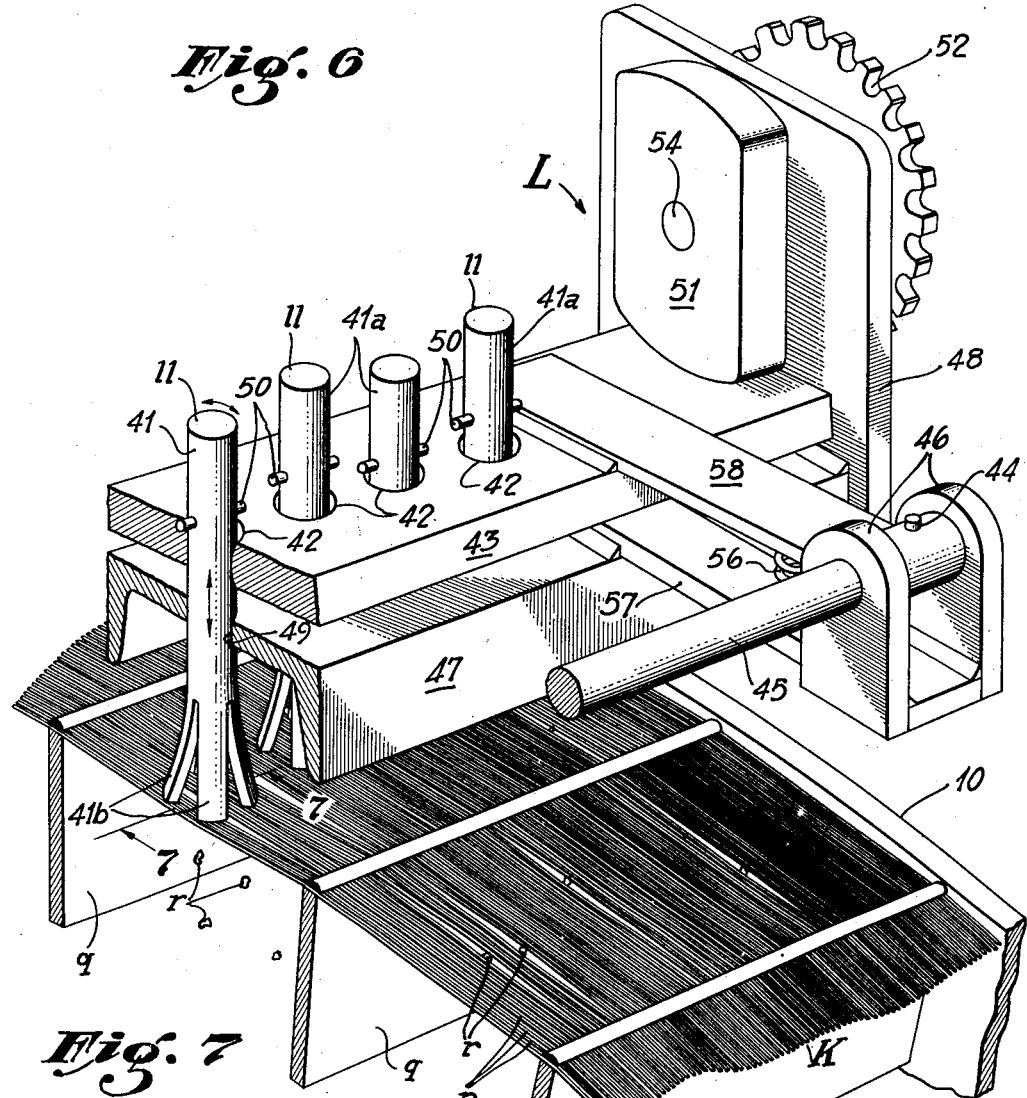
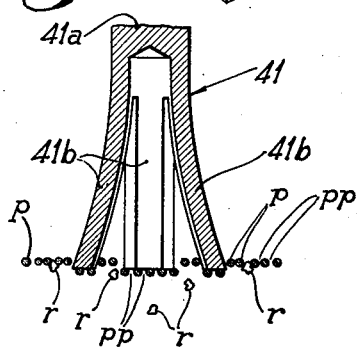

Patented Jan. 27, 1942

2,271,263

UNITED STATES PATENT OFFICE 2,271,263

APPARATUS FOR CLASSIFYING OR SEPARATING FLUID-BORNE MATERIALS

Harold V. Kapp, Long Beach, Calif.

Application October 14, 1939, Serial No. 299,532

4 Claims. (Cl. 210—199)

This invention relates to apparatus classifying or separating fluid-borne or dry materials, in a wide range of fields, including those of well drilling and metallurgy, and in a more particular respect concerns the "regeneration," so to speak, of oil well drilling fluid such as used in the rotary hydraulic system, in the practice of which a stream of well-drilling fluid is passed down through the tubular drilling string and exits at the bottom thereof or through the drill bit and then, in continuous circulation, rises to the surface orifice of the well hole, mudding up the wall thereof to assist in maintaining its integrity and to seal off and prevent invasion by gas and water. As the drilling fluid rises, it likewise elevates to the surface, for discharge from the well hole, the cuttings or chips or detritus produced in the progressive drilling of the well hole, and these are discharged with the drilling "mud." It is a particular object of the present invention to separate from the valuable drilling fluid or mud which is re-used, the said chips, cuttings, detritus and objectionable materials and particles of varying sizes and of varying characteristics. This drilling "mud" is so important in its service that it is even specially prepared with the inclusion therein of material recovered from natural deposits having the desired characteristics. To waste this valuable material or these valuable materials by simply discarding same at the mouth of the well with the chips and other fluid-borne materials, would result in great economic waste.

I have filed a preceding application for patent pertaining to this same general field, on August 9, 1937, Ser. No. 158,022, and entitled "Apparatus for and method of classifying or separating fluid-borne materials." The present subject-matter is readily distinguishable from the subject-matter of that prior application in many respects, so that the subject-matter of the present application constitutes either an improvement upon or departure from the subject-matter of said earlier application; and this is said without any attempt to comment upon any common features and characteristics which are generic with respect to both applications, and all of which will duly appear as the case may be. But reference is made to said earlier application for consideration of such aspects thereof as may be bracketed with any aspects of the present application.

The invention has for its objects to provide new and useful apparatus and a new and useful method of classifying or separating fluid-borne materials which will be readily superior in point of inexpensiveness and simplicity in make-up and procedure, considered in conjunction with facility and speed and effectiveness and dependability and completeness or high degree of performance, and which will be generally superior in efficiency and serviceability.

The invention consists in the novel and useful provision, formation, construction, combination, association, interrelation and sequence of parts, members, features and steps or phases of procedure, all as hereinafter disclosed, shown in the drawings and finally pointed out in claims. It is to be understood that the particular kind or character of fluid-borne material or materials, whether for well drilling use or otherwise, is not a critical aspect of the invention.

In the drawings:

Fig. 1 is a mainly diagrammatic view, in elevation, partly broken away for fullness of illustration, of a portion of an oil well derrick and drilling string and bit suspended therein from a hook, and further exhibiting discharge of outflow from the well hole and apparatus to which said outflow is directed for the purpose of classifying and separating materials included therein; and also a pit to which the recovered material or materials to be re-used is or are directed after being subjected to the action of the apparatus, and a pump for delivering the same back to the upper end of the tubular drill string;

Fig. 2 is an end elevation of the apparatus shown more or less diagrammatically in Fig. 1, and which performs the classifying or separating function or functions, and upon an enlarged scale;

Fig. 3 is a longitudinal sectional view taken upon the line 3—3, Fig. 2, and looking in the direction of the appended arrows, parts being shown in full lines;

Fig. 4 is a transverse sectional view, taken upon the line 4—4, Fig. 3, and looking in the direction of the appended arrows;

Fig. 5 is a detail, longitudinal, sectional view, upon a further enlarged scale, taken upon the line 5—5, Fig. 4, and looking in the direction of the appended arrows;

Fig. 6 is a much enlarged perspective view, partly in section and partly broken away, of details pertaining to means for preventing or eliminating obstruction of action of the apparatus or clogging of same, such means being also particularly illustrated in Figs. 2, 3 and 4; and Fig. 7 is a still very much further enlarged detail transverse sectional view taken upon the line 7—7, Fig. 6, looking in the direction of the appended arrows.

Corresponding parts in all the figures are designated by the same reference characters.

Referring with particularity to the drawings, I have shown in Fig. 1, more or less diagrammatically and fragmentarily, the lower portion of an oil well derrick A resting upon its base supports B, there being shown a hook C which it is understood is suspended suitably by cable from a block in the upper portion of the derrick, and which in turn suspends a drilling string D by a suitable swivel E, the drilling string being shown as including a joint or stand of drill pipe $d$ at the lower end of which is shown a fishtail bit $e$, the string likewise including at the upper end portion a squared member or "kelly" $f$, which passes slidably through a rotating table $g$ mounted to rotate upon a base $h$, the "kelly" $f$ having an interlocking engagement with the table for purposes of rotative couple. Through the swivel E the drill string is provided with circulation fluid or drilling fluid containing "mud," as by a flexible pipe or hose $k$, and, in accordance with the invention, this extends to or is connected in communication with a pump F disposed over a pit G from which the pump elevates recovered or reclaimed or renewed circulation fluid or "mud" or fluid carrying "mud" which proceeds to such pit by gravity through a trough or conveyor $l$.

Adjacent the upper portion of the well hole, which is generally designated as $m$, and which is progressively produced and developed by rotation of the drilling string D, is a lateral discharge opening $n$ and a conduit $o$ through which the effluent or overflow of the well hole is directed to means or apparatus designated in general H, and in the operation and functioning of which a classifying or separation takes place with respect to the fluid-borne burden proceeding thereto from the well hole. This will ordinarily comprise water and "mud," which, as previously observed, is even specially prepared with the inclusion therein of material recovered from natural deposits having the desired characteristics. It will also include in well drilling practice chips and cuttings and detritus which are produced or loosened or broken off or dislodged in the drilling operation in the use of the circulatory system, and which are borne to the top of the well by the ascending circulating fluid. The use of the "mud," in its application to the wall of the well hole, is well understood and needs no further discussion. Of course, in using the apparatus and method for other than well drilling purposes, as, for instance, in the separation and classifying of various mixed materials and substances which it is desired to refine or carry forward in the direction of refining, such as in the art of metallurgy, the particular adaptation and coupling of the means and apparatus H with other agencies can widely vary and would widely vary, all in accordance with the aims to be obtained and the results to be accomplished.

Hitherto, and before the efforts reflected in my said earlier application, it has been found difficult to carry on such classifying and separating of substances or materials in a dependable and continued performance, and one of the reasons therefor, which is particularly treated of and eliminated as a problem to procedure in the present application, has been the difficulty of causing an accurate and satisfactory separation of substances and materials, or classifying thereof, as to particle size and also as to unobstructed field of separation. The particle or mass size of the "mud" being much less than that of the detritus and chips and cuttings discharged from the well hole to the apparatus, it is essential that these latter materials be so handled as to separate them en masse, and likewise to permit the particles of the "mud" to pass through the separating agency without their becoming lodged therein and obstructing free passage by the "mud." Of course, in so separating or classifying materials with the object of recovering only such materials as have a relatively small particle size, it is required that the apertures through which the "mud" particles pass shall be relatively small in dimensions. This fact contributes to the readiness with which such apertures may become clogged, the smaller the apertures the more liability to such clogging. This, of course, is well understood in connection with the general art of screening, in which more frequent stirring and agitation of the fluid is required as the mesh decreases in size.

In accordance with the present invention, I provide flexible members or strands between which are apertures for passing and only passing the particles of "mud," and I likewise provide means for distorting the structure through which the separation and classification takes place. It results that any material particles which have become lodged as between members of the separating or classifying structure, are dislodged or displaced by such distortion, which free such particles for discharge in a special manner. The separating or classifying structure is preferably of a generally cylindrical or drum-like form, and such structure preferably rotates, and the distorting means are preferably arranged at or adjacent the top thereof, whereby the clogging or entrapped particles of material which are elevated for subjection to such distorting means project largely or mainly downwardly and beneath the separating or classifying structure, whereby but relatively slight distortion of the said structure is required to liberate and free same, and this is perhaps best illustrated in Fig. 6, wherein I have shown in the upper courses of travel of the separating and classifying structure a few of such clogging and entrapped particles, on a much enlarged scale, illustrating how their major projection is in the main downward in the upper course of separating structure.

This separating structure is designated generally in the means or apparatus H by the reference character K, and it comprises a single or, if desired or required, jointed continuous length of wire $p$, which is wound or disposed in a generally helical path upon elevator flights $q$ which are substantially radially disposed with respect to the total drum-like structure N which includes the same and said member $p$. While the exact diameter of the continuous flexible member or wire $p$ is not critical to the invention, nor is the exact width of the spaces between courses or strands thereof in its substantial helical disposition about the flight $q$, there may be given as suitable examples for separating or classifying with respect to well drilling "mud," a wire or member $p$, the diameter of approximately twenty one-thousandths of an inch, with intervening spaces between courses of said member of a width approximately five one-thousandths of an inch. In Fig. 6 there are shown a number of material particles $r$, which are temporarily lodged between courses of the member $p$ and upon an enlarged scale. These are likewise shown in Fig. 6, upon the ascending portion of the means K, or the portion which is proceeding in the direction of the means L for loosening, dislodging and freeing such particles, some of which are likewise shown upon an enlarged scale in Figs. 6 and 7, as dropping downwardly for normal discharge with undesired fluid-borne material in the operation of discharge means M, having a casing 8 with a wide open upper mouth portion, or with upwardly and outwardly inclined side portions, which casing is in position to receive such falling particles r. The flights q at their ends are welded or otherwise secured to annuli 10 and these annuli have each an outwardly projecting ring 11 furnished with sprocket teeth 12 which receive sprocket chains 13, one at each end of the drum-like structure, so that the latter structure, including the flights and the annuli and the continuous member p, are all as an operating unit cradled or suspended in and by these chains, which in turn are guided and supported by sprocket wheels 14, which are mounted upon two parallel shafts 15 ranging lengthwise of the apparatus H at opposite sides thereof, and suitably mounted in connection with upright frame members 16 which in turn are mounted upon and adjacent the ends of supporting skids 18 tied together by cross members 19. The shafts 15 are mounted in bearings 20, which are connected together by cross frame members or bars 21, one at each end of the mechanism, and having depending bases or feet 22 which rest upon rubber or other resilient blocks or supports 23, supported in turn by boxes 24 disposed at the upper ends of the upright frame members 16. The uprights 16 are likewise connected, at each end of the machine, by cross members 25, and are further also connected by cross brace members 26 at each end, both of these having supporting functions hereinafter described.

In order to introduce water-borne materials and substances and the water thereof from the well hole through the conduit o into the mechanism H, I provide a trough-like structure or delivery trough s which is open at the top and at one side, and ranges lengthwise of and within the drum-like structure heretofore described, and which includes the members p and q. This receives the outflow material from an inclined trough t disposed beneath its end portion outward of the apparatus at one end and the conduit o; and the function of this delivery trough s is to spread and discharge the outflow from the oil well substantially evenly from end to end of the drum-like structure and within the same, its open side being directed toward the flights q upon which lodge the large particles such as chips and cuttings and detritus and, as the drum-like structure rotates counter-clockwise as viewed in Fig. 4, these substances are elevated by the flights to a point at which the angle of repose is overcome. The parts of the overflow which are desired to be reclaimed, plus the water, fall into the lower course of the drum-like structure, which may be generally designated as N, and the fluidity thereof will result in the establishment of an accumulation of material in the lower course of such drum-like structure, largely fluid, and having and exerting a hydrostatic head, the top level of which is indicated generally at 22' in Fig. 4. It is to be understood, of course, that at all times there is a flow of this liquid down through the lower course of the drum-like structure and between the courses of the flexible member p, and the discharge of the reclaimable and desirable material particles of "mud" similarly, and this discharge is promoted and assisted by the action of this hydrostatic head as well as by the action of vibration means O, which include an enclosing casing 27 ranging lengthwise of the drum-like structure and supported at its end portions by lugs 28 attached to or formed upon the cross members 21. Within this casing is housed a rotating shaft 29 journaled at its end in anti-friction bearings 30, which are mounted in the ends of the casing 27, at one end thereof there being an oil seal device 32 whereby lubrication may be impounded within the casing 27 to serve the anti-friction bearings 30. Upon this shaft 29 are provided a number of eccentric weights 29a which act centrifugally in the rotation of the shaft, and vibrate the cross members 21 which support the brackets 14 and their shafts 15, because of the unstable mounting of the base portions 22 thereof upon the resilient or vibrating rubber or other supports 23, thus imparting vibration to the suspended drum-like structure swung or cradled in the sprocket chains 13.

I have previously adverted to means M for discharging from the machine the chips, cuttings, detritus and other rejected substances and materials, including dislodged particles r, and I referred to the wide open upper mouth 33 thereof, or of the trough 8 which, with its outwardly flaring side walls 8a, directs the entrapped material into a lengthwise ranging belly portion 34 where the material to be discharged from the apparatus is carried lengthwise of the apparatus in the direction shown by the arrow in the central portion of Fig. 3, the shaft rotating in the direction indicated by the arrow at the left thereof. This trough-like structure, with its top flaring portion and its curved lower portion, terminates in an upwardly inclined and outwardly directed spout 35, from which the discharged material, shown at w, escapes and is received upon a flooring or platform x where it accumulates and may be disposed of at a dump, or otherwise. This upwardly and outwardly directed spout 35 causes a resurgence of the fluid in the means M, as it accumulates, toward the other end of said means, where it may escape through a nozzle 36 to which may be applied or fitted a hose 37 for directing it either to the accumulated material w or to a "mud" discharge trough y attached to a transversely curved and dished pan or apron 38 which envelopes the lower course of the drum-like structure N, and in which is received the separated and classified and recovered and regenerated "mud" discharged through the means K, subject to the joint action of the vibration means O and the hydrostatic head in the drum-like structure. This trough y out through which passes such reclaimed "mud" and water, may descend into a casing or conduit Z whereby and wherethrough it may be directed as indicated by the arrows in Fig. 1 to the pit G. A spray pipe ZZ is shown in Figs. 1, 2 and 4, and which has a header 39 ranging lengthwise of and toward the top of and slightly above the drum-like structure N supplied by water pipe 40 providing water for any suitable source for contributing to the cleaning and scavenging of the structure K in its continued operation of separating and classifying the materials.

The vibrating or distorting means L functions to somewhat distort the reaches of the flexible member p as they span the spaces betweeen the flights q. This produces, of course, a vibration of such strands and the interstices or apertures between same are momentarily enlarged in the zone of distortion or vibration tending to free the entrapped or clogging material particles r as heretofore referred to and clear the member K of any such obstruction. To such ends I provide a plurality of substantially vertical reciprocating members 41 which have preferably elongated cylindrical body portions 41a and a furcated lower portion producing outwardly diverging legs 41b which normally rest upon the member p as most clearly shown in Fig. 6. They are mounted to play through somewhat relatively enlarged openings 42 in an arm 43 which is clamped as at 44 to a shaft 45, and that shaft extends continuously lengthwise of the machine and journaled in upturned bearing plates 46 adjacent opposite end portions of the machine. At one side of said shaft 45, and parallel with it, is a length of inverted channel iron 47, and that is supported at its ends by uprights 48 which in turn are supported by the frame cross members 26. The body portions 41a likewise play through more closely fitting openings 49 in this inverted channel iron, and each of said bodies 41a is provided adjacent its top portion with oppositely projecting pins 50 disposed above the arm 43.

Mounted to rotate in the upper end of the upright frame member 48 is a cam member 51 which is disposed to operate upon the free end portion of the arm 43, being operated by sprocket wheel 52 and chain 53 on the cam shaft 54, said sprocket being trained about a sprocket wheel 55 which is fast upon the shaft 15. A coil compression spring 56 is disposed between the arm 43 clamped to the shaft 45 and a bracket 57 which is supported by the inverted channel iron 47. The arm 43 is not directly connected with the shaft 45, but indirectly connected through the bracket arm 58, with such bracket arm and arm 43 at right angles to each other and the inverted channel iron 47 parallel with the arm 43. The operation of the cam 51 will produce alternate depression and elevation of the arm 43, the elevation occurring through the action of the compression spring 56. When the cam takes the position shown in Fig. 6, the arm 43 is relatively lowered away from the pins 50 so that members of the distorting means L, that is, the body portions 41a and foot 41b thereof, are free to drop through such openings 42 and the openings 49, impinging upon a number of the courses of the flexible member p and in such impingement or under such blow or under such tamping action causing momentary distortion of such lengths of the member p and somewhat enlarging the interstices or apertures between the reaches thereof so as to loosen and set free and liberate any material particles such as r which have become lodged in such structure. The restoration of the arm 43 to its normal elevated position causes engagement with the pins 50 in the bodies 41a and the resultant elevation of such distorting members which may be referred to separately as 11.

It will be understood that this action is transmitted through the arm 43 lengthwise of the source of such members 11.

The cam 41 is so timed in its action in the rotation of the shaft 54 that the members 11 are brought to bear upon the member p in its various strands between the elevator lifts q, thus avoiding striking such flexible member at or close to or over the elevator lifts q and tending to break or injure the same.

The vibrating means O are driven by sprocket wheel 59 mounted upon its shaft 29, and about the same is trained a sprocket chain 60 which in turn is trained about a sprocket wheel 61 mounted upon the shaft 62 of electric motor or other shaft and mounted upon the same shaft is another sprocket wheel 63 about which is trained a sprocket chain 64, which in turn is trained about a sprocket wheel 65 mounted upon one of the shafts 15 carrying the sprocket wheels 14 about which is trained the sprocket chain 13 which suspends the drum-like member N.

Mounted upon the shafts 15 respectively are sprocket wheels 66 about both of which is entrained a sprocket chain 67, which assures synchronous action and rotation of both sprocket wheels and shafts 15 and a steady and constant and unvarying drive of the drum-like structure N at a predetermined rate of rotation. Upon one of the shafts 15 is located another sprocket wheel 67a, and about that is trained a sprocket chain 68 in turn trained about a sprocket wheel 69 upon a shaft 70 which carries a screw feed or Archimedes screw 71, the shaft 70 being supported at one end by bracket 72 depending from the upper portion of the discharge mouth 35 of the casing within which such screw feed device operates, and having the depending belly-like portion 34 and diverging upper portions 8a; the opposite end turning in a suitable bearing 73 in the end wall 74 of such structure.

The operation, method of use and advantages of the improved apparatus and method heretofore described and illustrated in one embodiment of practice in the drawings, will be readily understood from the foregoing description, taken in conjunction with the accompanying drawings, and without any detail, separate statement. Effluent from the well, in the embodiment of the invention specifically disclosed, passes through the conduit v and trough t to the trough s and is discharged laterally therefrom within the drum-like structure N. It commingles with the material previously discharged in the lowermost course of the said rotating member N, and the chips and cuttings, etc., or heavy materials which it is desired to eliminate, are elevated by the flights q and finally discharged into the open mouth of the discharge means M and out through the elevated mouth thereof, and join the accumulations w for disposal as may be desired. The smaller and reclaimable portions and fluid accumulate in the lower course of the rotating member N, and gradually under vibration of the suspended member N and of the hydrostatic head having its upper level substantially at u, gradually find their way through the interstices or apertures pp and enter the apron or curved pan 38 at the bottom of the apparatus through an end opening yy and enter the trough y from which they are discharged into the passage Z which conducts them by gravity to the pit G. At all times during the operation of the machine the vibration is maintained by the means O and the distortion of the member p is maintained by the intermittently dropping action of the members 11 which are of a material weight, the weight of approximately a quarter pound each having been found satisfactory. These freely mounted members 11, due to the varying nature and glancing character of their impingement upon the member p, receive an urge to rotate upon their longitudinal axes or to "waltz"

so that the feet 41b differently and varyingly engage with such member p in a sequence of operations, subjecting the member p to a diversity of blows or impingement tending more certainly to free particles entrapped thereby and also distribute the wear upon the member p.

The casing 10 is provided at one of its ends with an arcuate opening 10a and at the other of its ends with an arcuate opening 10b which dips lower than the opening 10a so that any overflow of fluid may pass through the opening yy and into the trough y for discharge with the recovered material.

As has been pointed out, any excess of fluid within the casing 34 or its attached parts may find its way back to the left-hand end thereof in Fig. 3 and be discharged through the pipes 37 either into trough y or on to the support or table x or whatever surface receives the discarded material w.

I have found that by using the apparatus and method herein disclosed I am able for maintained periods of service and operation to provide an effective separation and classification of materials, and to insure long life and durability for the apparatus. It is to be understood that various materials and substances may be classified and separated by this apparatus and method, and the invention is not to be considered as limited to the use of same for any particular use or substances, and it is also to be understood that many varying changes and substitutions and modifications may be made in the structure and parts and members and features of performance and steps of the process in adapting the same to varying conditions of use and service without departing from the true spirit of the invention.

Having thus disclosed my invention, I claim and desire to secure by Letters Patent:

1. Separating apparatus comprising a material screening drum, means for feeding material to be screened to said drum, flexible means suspending said drum for free shaking movements, and means operating through said suspending means to shake said drum.

2. Separating apparatus comprising a material screening drum, means for feeding material to be screened to said drum, endless flexible elements suspending said drum for rotation and for free shaking movements, means for rotating said drum, and means for shaking said drum during its rotation.

3. Separating apparatus comprising a horizontally disposed material secreening drum having a sprocket wheel at each end thereof, a drum supporting structure comprising a pair of sprocket wheels at each end of said drum held against movement toward and away from one another and yieldably supported for vertical movements, a sprocket chain trained about each pair of sprocket wheels and the related drum-carried sprocket wheel and suspending the drum for rotation and for free shaking movements, means for actuating said sprocket chains to rotate said drum, means for feeding material to be screened to said drum, and means for shaking said drum during its rotation.

4. Separating apparatus comprising a horizontally disposed material screening drum having a sprocket wheel at each end thereof, a main drum supporting structure, an auxiliary drum supporting structure yieldably mounted upon said main drum supporting structure for vertical movements relative thereto, a pair of spaced sprocket wheels carried by said auxiliary drum supporting structure adjacent to each end of said drum, a sprocket chain trained about each pair of sprocket wheels and the related drum-carried sprocket wheel and suspending the drum for rotation and for free shaking movements, means for actuating said sprocket chains to rotate the drum, means for feeding material to be screened to said drum, and means for shaking said auxiliary drum supporting structure, thereby to shake said drum.

HAROLD V. KAPP.